Patented Feb. 28, 1928.

1,660,756

UNITED STATES PATENT OFFICE.

FRANK E. LICHTENTHAELER, OF NEWTON HIGHLANDS, MASSACHUSETTS.

METHOD OF CONCENTRATING AQUEOUS SOLUTIONS OF FATTY ACIDS.

No Drawing.   Application filed January 21, 1926. Serial No. 82,853.

The present invention relates to an improved method of concentrating aqueous solutions of fatty acids.

The separation of the water found in dilute fatty acids is a matter of difficulty and expense.

The object of the present invention is to produce a method of concentrating aqueous solutions of fatty acids, and to this end the invention consists in the method hereinafter described and particularly defined in the claims.

Broadly stated, the invention consists in concentrating dilute fatty acids by dehydration with a hydrate-forming salt in the presence of sufficient alcohol to form the corresponding ester, using a proper catalyst to initiate and sustain esterification, separating the ester from the hydrate-forming salts and catalyst, and subsequently saponifying the ester to regenerate the acid and alcohol.

A description of a specific example of this method is as follows: Let it be assumed that it is desired to concentrate dilute acetic acid (10.6% acetic by titration). 100 grams of this acetic acid will be mixed with 18 grams of ethyl alcohol (95% by volume) and 10 grams of sulphuric acid (50° Baumé). After these are mixed there will be stirred into the mixture 135 grams of anhydrous ammonium alum. The stirring is now continued with the application of heating or cooling, as may be required, to maintain the temperature of the mixture safely below the decomposition point of hydrated ammonium alum, i. e. 94° C., which constitutes the hydrate-forming salt. The heat of the reaction will usually be sufficient for esterification. The sulphuric acid acts as a catalyst to initiate and sustain the formation of the ester (in this case ethyl acetate). The anhydrous alum by fixation of the water present and formed during esterification causes the reaction to take place at the maximum concentration of the reacting materials. This is the most favorable condition. The anhydrous alum by taking up the water, including that produced by esterification, causes the reaction to proceed to completion.

The operation during the stirring is believed to be first the taking up of the water present by the ammonium alum and its transformation from an anhydrous condition to its hydrated condition. This reduces the amount of dilution of the acetic acid and the gradual withdrawal of the water from the mixture continues until the alcohol present is sufficiently high in percentage to permit the initiation of the esterification. As the esterification proceeds it generates the water, and such water is continuously withdrawn from the solution by the ammonium alum.

The reaction is as follows:

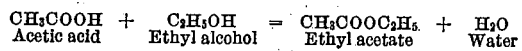
$$CH_3COOH + C_2H_5OH = CH_3COOC_2H_5 + H_2O$$
Acetic acid  Ethyl alcohol  Ethyl acetate  Water This is a reversible reaction, and unless the water generated is constantly removed, reversal of the reaction takes place and the ethyl acetate goes back to acetic acid and alcohol. Consequently it is necessary continuously to withdraw the water from the solution so as to preserve the excess of alcohol which is required for the performance of the reaction. More or less alcohol may be used. In the proportions above given, more is prescribed than is actually necessary, but the amount of alcohol used is not the essence of the invention.

The product constitutes a mass of loose, apperently dry crystals of hydrated ammonium alum, but which betray the presence of ethyl acetate by its odor. This is the first step in removing the water from the acetic acid. The second step consists in taking this mass of crystals of hydrated ammonium alum and subjecting it to the action of heat for the purpose of driving off the ethyl acetate.

The mass of crystals is now treated to remove the ester by heating it slowly and gradually under sufficient vacuum to cause the easy removal of the ester (normally boiling at 77° C.).

By means of the first step of the process the aqueous diluent of acetic acid is removed, and according to the second step the ethyl acetate produced by the esterification of the acetic acid is separated from the water held by the hydrate-forming salt, and then the third step of recovering the acetic acid in its concentrated condition is accomplished by saponification. This saponification back into acetic acid will be accomplished by heating the ethyl acetate in the presence of sodium hydroxide or water or an acid.

Instead of ammonium alum, any other suitable hydrate-forming salt may be used, such as magnesium sulphate, or potassium alum, or the like.

For the sulphuric acid catalyst employed in the conversion of the acetic acid into ethyl acetate any other suitable ester-reaction catalyst may be employed, as, for example, sodium acid sulphate, which is preferred because of its greater stability, and for the further reason that it remains with the hydrated salt when the ester is driven off by the heating treatment.

The separation of the ester from the mass of hydrated hydrate-forming crystals may be accomplished in other ways than that described, as by the method of my Patent No. 1,492,717, dated May 6, 1924.

In the example given, acetic acid was the particular fatty acid to the dilute solution of which the method was applied in order to effect its concentration, but the method is adapted for use with any of the fatty acids, and instead of ethyl alcohol, methyl alcohol is available for use in effecting the esterification of the fatty acid.

The complete method contemplates dehydration and esterification by the use of a hydrate-forming salt and an alcohol in the presence of a catalyst, and subsequent regeneration of the original fatty acid by saponification.

One of the uses to which this method may conveniently be put is the removal of the fatty acids from pyroligneous liquors produced by wood distillation. These liquors contain methyl alcohol, fatty acids, acetone, tar, etc., and the methyl alcohol could be made to react in the manner described with the acetic acid to form methyl acetate, leaving an excess of acetic acid by the addition of further methyl or ethyl alcohol to complete the esterification of all the fatty acids. Their removal could be accomplished as described, and the esters separated and refined by distillation and regenerated into the acids, acid salts and alcohols.

Having thus described the invention, what is claimed is:—

1. The method of concentrating dilute fatty acids which consists in adding an anhydrous hydrate-forming salt to take up the diluent, esterifying the acid by use of an alcohol in the presence of an ester-reaction catalyst, separating the ester from the hydrated hydrate-forming salt and catalyst and saponifying the ester to regenerate the acid and recover the concentrated fatty acid.

2. The method of claim 1, in which the fatty acid used is acetic acid.

3. The method of claim 1, in which the catalyst used is sodium acid sulphate.

4. The method of claim 1, in which the esterifying alcohol is ethyl alcohol.

5. The method of claim 1, in which dilute acetic acid is treated with anhydrous ammonium alum to take up the diluent, and esterified by ethyl alcohol in the presence of sodium acid sulphate.

In testimony whereof I have signed my name to this specification.

FRANK E. LICHTENTHAELER.